(12) United States Patent
Keene et al.

(10) Patent No.: US 9,222,784 B2
(45) Date of Patent: Dec. 29, 2015

(54) BUILDING PERPENDICULARITY TESTING AND ADJUSTMENT

(75) Inventors: Richard M. Keene, Park City, UT (US); Stephen Kent Garland, Salt Lake City, UT (US); Milne T. Crouch, West Jordan, UT (US); Daniel Travis Maxwell, Salt Lake City, UT (US); Daniel C. Maxwell, West Valley City, UT (US)

(73) Assignee: Myles L. Strohl, Naples, FL (US)

( * ) Notice: Subject to any disclaimer, the term of this patent is extended or adjusted under 35 U.S.C. 154(b) by 1002 days.

(21) Appl. No.: 13/236,521

(22) Filed: Sep. 19, 2011

(65) Prior Publication Data

US 2012/0239332 A1 Sep. 20, 2012

Related U.S. Application Data

(60) Provisional application No. 61/384,118, filed on Sep. 17, 2010.

(51) Int. Cl.
*G01C 21/00* (2006.01)
*G01C 21/20* (2006.01)
*G01S 19/17* (2010.01)
*G01S 19/49* (2010.01)

(52) U.S. Cl.
CPC ............... *G01C 21/206* (2013.01); *G01S 19/17* (2013.01); *G01S 19/49* (2013.01)

(58) Field of Classification Search
CPC .................. G01C 21/206; G01C 21/10–21/16; G01S 19/42; G01S 19/17
See application file for complete search history.

(56) References Cited

U.S. PATENT DOCUMENTS

| | | | |
|---|---|---|---|
| 4,771,394 | A | 9/1988 | Cavanagh |
| 6,009,375 | A | 12/1999 | Sakumoto et al. |
| 6,307,475 | B1 | 10/2001 | Kelley |
| 6,424,264 | B1 | 7/2002 | Giradin et al. |
| 6,813,582 | B2 | 11/2004 | Levi et al. |
| 2002/0026282 | A1 | 2/2002 | Turetzky |
| 2004/0059502 | A1 | 3/2004 | Levi et al. |
| 2004/0070515 | A1 | 4/2004 | Burkley et al. |
| 2004/0085209 | A1 | 5/2004 | Schmidt et al. |
| 2004/0230374 | A1 | 11/2004 | Tzamaloukas |
| 2005/0017899 | A1 | 1/2005 | Cervinka et al. |

(Continued)

FOREIGN PATENT DOCUMENTS

| | | |
|---|---|---|
| JP | 2000/097722 | 4/2000 |
| KR | 10-0947117 | 3/2010 |

OTHER PUBLICATIONS

U.S. Appl. No. 12/709,003, filed Feb. 19, 2010; Paul Losee; office action issued Feb. 21, 2012.
U.S. Appl. No. 12/709,003, filed Feb. 19, 2010; Paul Losee; office action dated Dec. 17, 2013.
U.S. Appl. No. 13/236,522, filed Sep. 19, 2011; Richard M. Keene; office action dated Jun. 12, 2014.

(Continued)

*Primary Examiner* — Mischita Henson
(74) *Attorney, Agent, or Firm* — Thorpe North & Western

(57) ABSTRACT

Tracking a person in a building can be performed by obtaining a building layout with respect to a surrounding geography and tracking movement of the person using a monitoring device carried by the person. A correction angle can be calculated to normalize tracked movement of the person with respect to a skew angle of the building layout. The correction angle can be applied to the tracked movement of the person or the building layout.

27 Claims, 7 Drawing Sheets

(56) References Cited

U.S. PATENT DOCUMENTS

| | | |
|---|---|---|
| 2005/0033515 A1 | 2/2005 | Bozzone |
| 2005/0092823 A1 | 5/2005 | Lupoli et al. |
| 2005/0137786 A1 | 6/2005 | Breed |
| 2005/0240345 A1 | 10/2005 | Yamamoto |
| 2005/0289162 A1 | 12/2005 | Saitta |
| 2006/0064276 A1 | 3/2006 | Ren et al. |
| 2006/0262120 A1 | 11/2006 | Rosenberg |
| 2006/0277474 A1 | 12/2006 | Robarts et al. |
| 2007/0008099 A1 | 1/2007 | Kimmel et al. |
| 2007/0213927 A1 | 9/2007 | Ishigami et al. |
| 2007/0250261 A1 | 10/2007 | Soehren |
| 2008/0077326 A1* | 3/2008 | Funk et al. .................. 701/220 |
| 2008/0275348 A1 | 11/2008 | Catt et al. |
| 2009/0043504 A1 | 2/2009 | Bandyopadhyay et al. |
| 2010/0121572 A1 | 5/2010 | Berardi et al. |
| 2010/0214118 A1 | 8/2010 | Losee |
| 2010/0218101 A1 | 8/2010 | O'Shaughnessy et al. |

OTHER PUBLICATIONS

U.S. Appl. No. 12/709,003, filed Feb. 19, 2010; Paul Losee; Office Action issued Oct. 19, 2011.
U.S. Appl. No. 13/236,522, filed Sep. 19, 2011; Richard M. Keene.
PCT Application PCT/US2010/052227; filing date Sep. 19, 2011; Stephen Kent Garland; International Search Report mailed May 7, 2012.
PCT Application PCT/US2011/052228; filing date Sep. 19, 2011; Stephen Kent Garland; International Search Report mailed May 7, 2012.
U.S. Appl. No. 12/709,003, filed Feb. 19, 2010; Paul Lossee; office action dated Aug. 27, 2014.
U.S. Appl. No. 13/236,522, filed Sep. 19, 2011; Richard M. Keene; office action dated Jan. 5, 2015.

* cited by examiner

BUILDING PERPENDICULARITY TESTING AND ADJUSTMENT

PRIORITY CLAIM

Priority is claimed to U.S. Provisional Patent Application Ser. No. 61/384,118 filed on Sep. 17, 2010, which is incorporated herein by reference in its entirety.

RELATED APPLICATIONS

This application is related to U.S. patent application Ser. No. 12/709,003 filed on Feb. 19, 2010, the entire contents of which are incorporated herein by reference.

This application is related to U.S. patent application Ser. No. 13/236,522 filed on Sep. 19, 2011, the entire contents of which are incorporated herein by reference.

BACKGROUND

The ability to accurately track and locate personnel can be valuable to a mission's success or failure. Mission commanders leading an emergency response team, for example, are often limited in the ability to determine where critical assets are located, including human assets that have been dispatched into the field. Certain technologies have been developed that can enable the tracking of assets. These technologies are typically reliant on continuous radio frequency communications. For example, global positioning satellite (GPS) systems and other types of triangulation systems can be used to determine a location of an asset based on the timing of radio signals received at the asset location. The ability to track assets using radio frequency signals has greatly improved a commander's ability to track and locate desired assets.

However, in many types of emergencies, radio frequency communications can be spotty. Tornadoes and hurricanes often destroy power and communications infrastructure, thereby reducing the ability to use land based communications and radio frequency triangulation systems. Buildings and storms can impede radio frequency signals to the point where GPS systems can be useless. Thus, over reliance on tracking devices that rely on continuous radio frequency communications can actually impede progress in an emergency response when the tracking devices cease to function properly due to the environment or other conditions at the emergency location.

SUMMARY

Tracking a person in a building can be performed by obtaining a building layout with respect to a surrounding geography and tracking movement of the person using a monitoring device carried by the person. A correction angle can be calculated to normalize tracked movement of the person with respect to a skew angle of the building layout. The correction angle can be applied to the tracked movement of the person or the building layout.

Perpendicularity of the building can also be calculated to determine the efficacy of the normalization of movement.

A system for tracking a person in a building in accordance with an example includes a monitoring station operable to receive data signals comprising a plurality of dimensions of step movement of the person as detected by a monitoring device carried by the person. A correction module can calculate a correction angle to normalize tracked movement of the person with respect to a skew angle of a layout of the building. A tracking module can apply the correction angle to at least one of the tracked movement of the person and the building layout and to track the movement of the person by estimating a location of the person from the data signals.

A system for tracking a person in a building in accordance with an example includes a monitoring station operable to receive data signals comprising a plurality of dimensions of step movement of the person as detected by a monitoring device carried by the person. A tracking module can track the movement of the person with respect to a building layout by estimating a location of the person from the data signals. A forward look-ahead path correction module can correct a movement offset of the person when a path of the movement of the person is blocked by a wall of the building and steps of the person are continued to be detected. The forward look-ahead path correction module can identify a straight path and two angled paths on opposite sides of the straight path for path continuity candidates; determine whether a path continuity candidate exists for the straight path or at least one of the two angled paths; and project a position of the person onto an existing path continuity candidate according to a number of the detected steps of the person.

DETAILED DESCRIPTION

Figure 1:
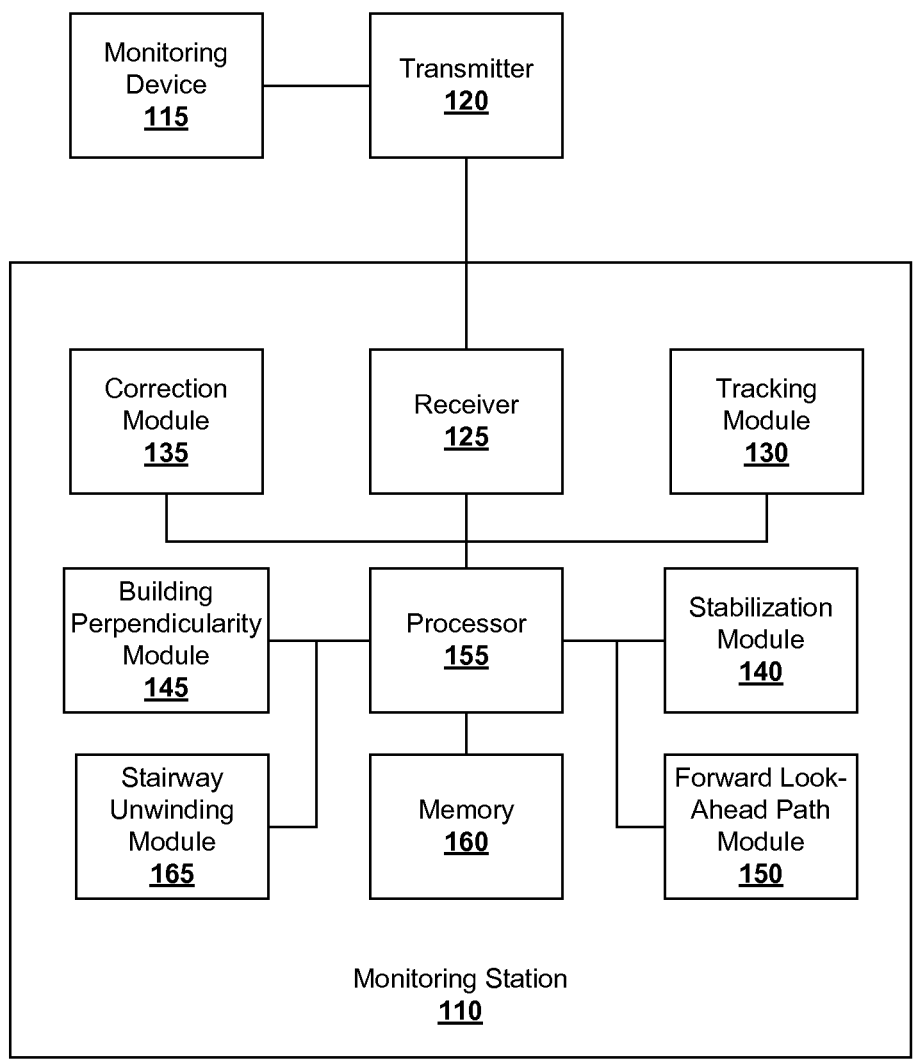
FIG. 1 is a block diagram of a system for tracking a person in a building in accordance with an example of the present technology.

Before the present disclosure is described herein, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

The following terminology will be used in accordance with the definitions set forth below.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Example Embodiments

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing the movement tracking and/or correction per se, the device, system, and/or method embodiments are also included in such discussions, and vice versa.

Furthermore, various modifications and combinations can be derived from the present disclosure and illustrations, and as such, the following figures should not be considered limiting.

The ability to accurately track human assets involved in emergency missions and other first response scenarios can significantly enhance a mission leader's ability to make decisions that will increase the probability of success of the mission. However, the leader's decisions are only as good as the data provided. If radio frequency tracking equipment that is relied on to track human assets provides inaccurate data, or worse, no data at all, the reliance on the tracking equipment can have a negative effect on the outcome of the mission.

As previously discussed, asset tracking in emergency situations using radio frequency tracking equipment may not be reliable, especially in disaster situations such as tornadoes, flooding, hurricanes, and war time situations. The destruction of land based infrastructure may reduce or eliminate signals needed to allow the tracking equipment to work. For example, the tracking equipment may be reliant on land based cellular telephone transmitters to provide tracking of assets based on triangulation of radio frequency signals. The cellular telephone transmitters can be destroyed or disrupted by power failures in natural disasters, thereby reducing their reliance. GPS systems can prove more robust in a disaster area due to their use of space based satellite signals for use in triangulation. However, since the GPS signals are sent from satellites located thousands of miles away, the signal power received at a GPS receiver is quite low, thereby providing a significant probability that the signal may be lost in urban areas, within buildings, during a severe storm, and so forth.

Even a brief disruption can be unacceptable in certain situations. For example, in a high rise building fire it can be critical to know where each emergency responder is located in the event that the responders need to be evacuated. Many of the responders may be positioned in locations within the building that are not amenable to receiving and transmitting radio frequency signals. Thus, positional awareness of each emergency responder's location cannot be accomplished by relying on radio frequency communications alone.

In order to increase the reliability of asset tracking in first responder, emergency, and security situations, one or more backup systems can be used to supplement information obtained through radio frequency tracking. More specifically, deduced reckoning techniques can be used to supplement the radio frequency tracking of human assets to provide substantially accurate positional information to enable mission commanders to make more informed decisions in time critical situations.

In tracking a person in or around a building, devices such as gyroscopes, magnetometers or compasses, accelerometers, barometers, and the like can be used to detect changes in position and elevation, even when GPS and other devices may be rendered inoperable. Some inertial tracking systems can be used to identify movement forward, backward, sideward, upward, downward, etc., but may not provide information relative to magnetic North or any other particular reference location. The tracking information can be used to map and display the movement of a person relative to a building. Mapping the movements of the person to a building with a different alignment than the calibration of movements of the person can be confusing because the person may be moving in a direction which does not make sense when overlaid directly on a building layout. For example, the tracked person may appear to be walking through walls or along non-existent pathways.

When displaying a tracked person inside a building, various constraints can be placed on received location information of the person's motion within the building. For example, there may be an assumption that the building is straight and includes rectangular structures. Previous systems and methods further assumed that the structures were oriented along a North/South line. However, assuming the structure is oriented along a North/South line can introduce various errors to tracking estimations since many buildings are not oriented along the North/South line. By assuming that all navigation within a building is along halls that are straight and perpendicular, the displayed paths of a person being tracked can be forced to be located within the halls. Tracking can be more accurately accomplished when the assumptions are correct or met.

In one example a model of a building can be built from satellite or other imagery. The model can outline the outside walls of the building, any court yards, etc. Various different configurations can be used to build a building model. If the building under consideration meets certain criteria, the building layout can be used to improve the identified location of the person with respect to a model of the building. Some issues that can be considered in building modeling are:

1. The building outline. Halls near the walls will tend to be in the direction of the outline.
2. Elevation Limitations. For example, though a person may enter and leave a building through the first floor, upper floors will typically have all navigation contained within the floor. Thus, any movement outside of an upper floor can be considered as illegal or invalid information and the tracking can be adjusted for the discrepancy.
3. Changes in the outline of the building with elevation. For example, if the building narrows at floor 5, a person may be tracked onto the roof of floor 4 (outside of floor 5). Floors 6 and up would be restricted to movement within the floor confines (assuming no further narrowing).
4. The building may not be located on the North/South line but at some other angle with respect to the North/South line.

In some examples a building or facility can be surveyed in advance. For example, if a mine survey is available movement can be restricted to known tunnels disclosed by the survey since a person will be unable to walk outside of the tunnels through solid rock.

In actual implementation various corrections can be made for building orientation, instrument drift, and other errors. For example, if a person is walking down a hall and the tracking exhibits a small drift, the drift is possibly or likely based on drift of the instrument and not the person. Thus, the person can be tracked in a straight line (i.e., down the hall) with the reported drift of the instrument (i.e. compass or gyroscope) corrected. When the drift or change exceeds a small value the person is likely changing direction and the change can be recognized.

Referring now to FIG. 1, a block diagram is illustrated of a system for tracking a person in a building, in accordance with an example of the present technology. The system includes a monitoring station 110 operable to receive data signals associated with movement of the person as detected by a monitoring device 115 carried by the person. A correction module 135 can calculate a correction angle to normalize tracked movement of the person with respect to a skew angle of a layout of the building. A tracking module 130 can apply the correction angle to at least one of the tracked movement of the person and the building layout and to track the movement of the person by estimating a location of the person from the data signals received from the monitoring device 115.

The tracking system may be operated from a monitoring station 110. The monitoring station may be located in a vehicle, building, tent, or other permanent or temporary, fixed or movable structure. The monitoring station may be used to track one or more people or assets, assets including human beings, animals (such as a rescue dog), robots, etc. In the context of this disclosure, an asset is typically capable of multi-pedal movement, such as bipedal or quadrupedal movement for example. However, other forms of movement such as rolling, slithering, and so forth may also be accounted for and corrected to display a substantially accurate path and location of the tracked asset.

The person or asset being tracked can carry a monitoring device 115. The monitoring device can be operable to detect various positional and environmental data or other aspects related to the movement of the person. For example, the monitoring device can detect a plurality of directions of the movement, such as forward, backward, sideward, upward, or downward directions or angles. The monitoring device can include an inertial measurement unit, an accelerometer, a barometer, a compass or magnetometer, a gyroscope, or any combination of these devices. In some examples, the monitoring device can include a global positioning system (GPS) device in combination with the aforementioned monitoring devices. The positional data relayed by the GPS can be supplemented by the monitoring devices, especially when the GPS data cannot be received or relayed by the monitoring device.

The monitoring device 115 can be configured to be coupled to a transmitter 120. The transmitter can be configured to transmit data signals, as obtained from the monitoring device, to a receiver 125 at the monitoring station 110. The data signals can include the detected positional data of the person. In one example, the data signals can further include time stamps associated with the positional data. The positional data can often be associated with a person's steps. The steps can be monitored by the measurement devices in the monitoring device, such as the accelerometer and gyroscope. This information can be used in calculating step frequency and step length, which can be combined with other information to approximate a location of the asset.

The transmitter 120 and receiver 125, while primarily described in terms of a unidirectional communication link, may each comprise transceiver devices capable of both transmitting and receiving data, and thus may form a bidirectional communication link. Communication between the transmitter and receiver may be wired or wireless. In many applications, wireless communication may provide more freedom of movement and have various advantages over wired communications. The communication may be performed using any known, suitable technologies or protocols. Some non-limiting examples of wireless technologies include Wi-Fi (IEEE (Institute of Electrical and Electronics Engineers) 802.11a,b, g,or n), Global System for Mobile Communications (GSM), Code Division Multiple Access (CDMA), General packet radio service (GPRS), Wideband Code Division Multiple Access (W-CDMA), Enhanced Data rates for GSM Evolution (EDGE) or CDMA2000, ZigBee, Bluetooth, IEEE 802.16, commonly referred to as Worldwide Interoperability for Microwave Access (WiMAX), Third Generation Partnership Project (3GPP) Long Term Evolution (LTE), satellite communications, and so forth.

The system can include a correction module 135. The correction module can be configured to calculate a correction angle to normalize tracked movement of the person with respect to a skew angle of a layout of the building. As described above, as the person moves within or around a building, the monitoring device 115 carried by the person detects the movement of the person and transmits the detected information as data signals to the monitoring station 110. The detected information can include location information in three orthogonal dimensions (i.e. x, y, and z axes) that is collected at a predetermined rate as a person moves. The data signals can be stored in a database or memory 160 and can be used to approximate a path or position of the person. This path or position may be represented tabularly, graphically, or in another desired format, and may be presented on a display device to a monitoring attendant. Normalization of tracked movement of the person refers to the normalization of the received data signals or path/position representation of the person with respect to the building layout rather than of the actual physical movement of the person, which is independent of the monitoring station.

A building perpendicularity calculation module 145 can be used with the correction module 135 to determine an orientation of the building in order to accurately normalize the tracked movement with respect to the building. For example, the building perpendicularity calculation module can determine an orientation of the building relative to a known direction, such as defined by a North-South line, as determined by a compass or the like. While a North direction or North-South line is described herein, any arbitrary direction, reference, etc. may be used to determine an orientation of the building relative to said arbitrary direction, reference, etc. The building perpendicularity calculation module can calculate an average orientation of walls of the building and test whether a majority of the walls fit within a predetermined number of angular intervals by rotating a wall orientation in 90 degree increments until the wall orientation fits within at least one predetermined angular interval. The building perpendicularity calculation will be described in further detail below.

The system can include a tracking module 130 configured to apply the correction angle determined by the correction module 135 to at least one of the tracked movement of the person and the building layout and to track the movement of the person by estimating a location of the person from the data signals. As an example, a number of steps in a detected direction can be combined with an actual detected, estimated, or calculated step length of the person to determine approximately how far the person has moved and in what direction. Such tracked movement can be aligned with the building layout to accurately represent movement of the person with respect to the building.

The tracking module 130 can be configured to apply the correction angle when the movement of the person with respect to the skew angle of the building layout is less than a predetermined angle. The tracking module can also be configured to track individual steps of the person and to apply the correction angle when both steps (i.e. a left and right step) of the person with respect to the skew angle of the building layout are less than a predetermined angle and to not apply the correction angle when zero or one steps of the person with respect to the skew angle of the building layout are greater than the predetermined angle.

The system can include a stabilization module 140. As will be described further below, steel beams and the like can skew output from a magnetic compass, which could lead to inaccurate tracking. Therefore, in one example, where the monitoring device includes a compass and a gyroscope, the gyroscope can be used to stabilize an output from the compass. Devices such as gyroscopes can drift over time and require correction. Therefore, in one example, the gyroscope output can be stabilized using a compass output or a building orientation or wall of the building to correct for the drift.

The system can include a stairway unwinding module 165 configured to correct for inaccuracies in monitoring devices on winding stairways. Stairway unwinding will be described in further detail below.

Also to be described in greater detail below is the forward look-ahead path correction module 150 shown in FIG. 1. Briefly, the forward look-ahead path correction module can be used to correct a movement offset of the person when a tracked path of the movement of the person is displayed in relation to a model of a building and the path becomes blocked by a wall in the model of the building and steps of the person are continued to be detected beyond the block.

The system can further include one or more processors 155, random access memory (RAM) and non-volatile memory 160, I/O buses, and other components for use by the various modules in performing the described functionality of the modules. In one aspect, the system memory can include program instructions that when executed by the processor function as the modules described above.

In some examples, a system and/or method can be implemented using the memory 160, processor 155, and/or computer readable medium. For example, an article of manufacture can include a memory or non-transitory computer usable storage medium having computer readable program code or instructions embodied therein for tracking an asset and comprising computer readable program code capable of performing the operations of the methods described. In another example, the memory can include portable memory containing installation files from which software can be installed or remote memory from which installation filed can be downloaded. Also, program instructions stored in the memory can be embodied in installation files or installed files.

Figure 2:
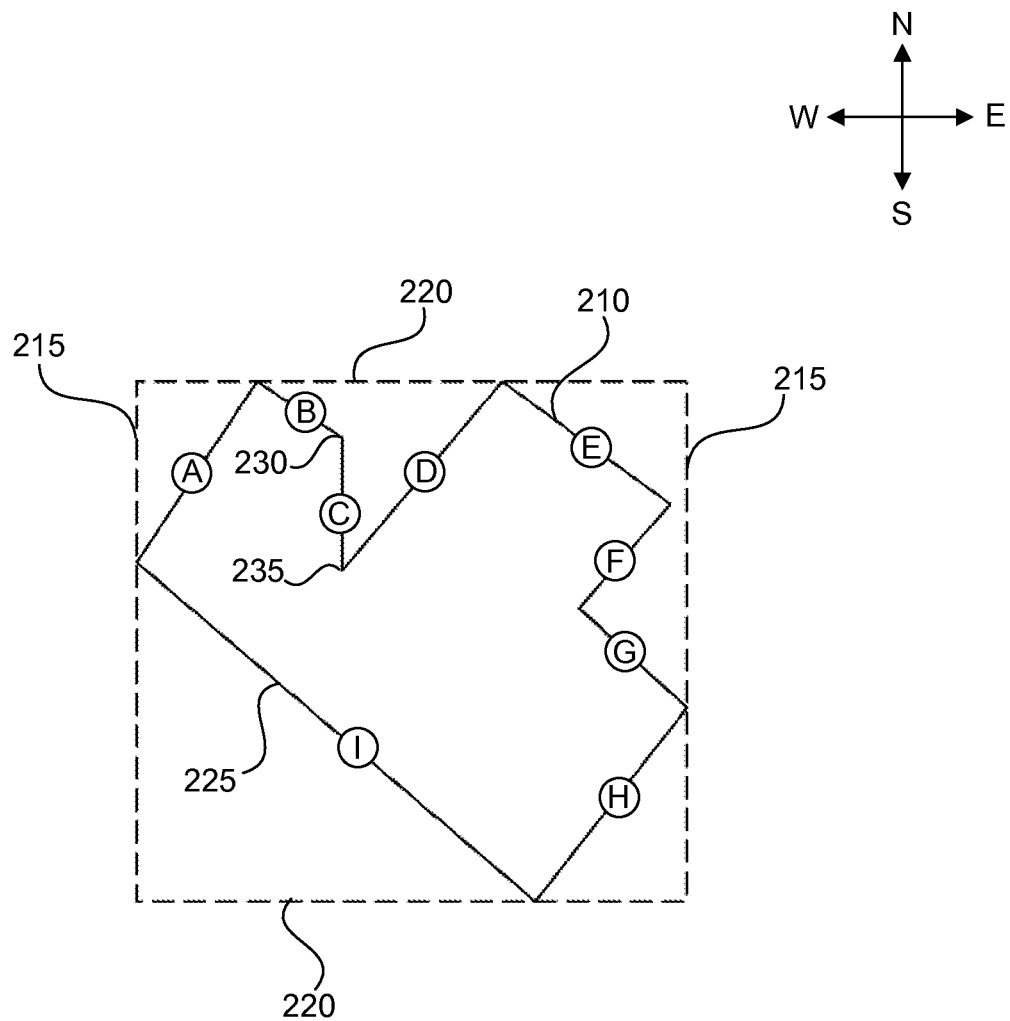
FIG. 2 is a top schematic view of a building layout in accordance with an example of the present technology.

Referring now to FIG. 2, a building outline 210 is shown in solid lines within the confines of dashed lines 215, 220. The dashed lines can represent North/South 215 and East/West 220 directions. As can be appreciated from FIG. 2, the building is not aligned with a North/South line. However, the building is mostly square at the corners and appears to have substantial perpendicularity With regards to FIG. 2, an assumption can be made that the building is perpendicular. However, to accurately track a person within the building, the angle of the building can be normalized with respect to tracked movement of the user. For example, a user can start at a starting point with a known position. The tracking system can track movements or steps of the user from the starting point. The orientation of the building model can be adjusted with respect to the orientation of the user, at least from the starting point, such that user movements can be accurately mapped within or around the building. For example, assuming the user is facing the lower left long face 225 of the building and moves forward, the tracking system may register the movement along a different axis, such as along a Y axis, for example. Thus, rather than tracking the person directly toward the building, the user may be tracked as going indirectly toward the building at an angle. To correct for this error, the building model can be rotated such that the received data that is associated with the mapping or tracking of the person with respect to the building is accurate and represents actual information or movement. As an alternate implementation, the tracked movement of the person can be rotated with respect to a building model/outline to correct for the error.

In some examples, determination of the perpendicularity (or degree of perpendicularity) of the building can be useful to identify whether or when assuming the building is perpendicular will result in accurate tracking within the building.

The building 210 of FIG. 2 is a substantially perpendicular building. In other words, the corners are primarily formed at substantially right angles. The building includes two corners 230, 235 that do not form right angles. Also, as discussed above, the building is not sitting on a North/South line 215 but is sitting at some angle with respect to the map coordinates. To accurately track a person within the building, determination of which angle to use for skew correction can be valuable. Also, testing whether the building conforms within an acceptable deviation to a standard or perpendicular layout can be useful in determining whether to restrain tracking to within assumed hallways, etc.

Figure 3:
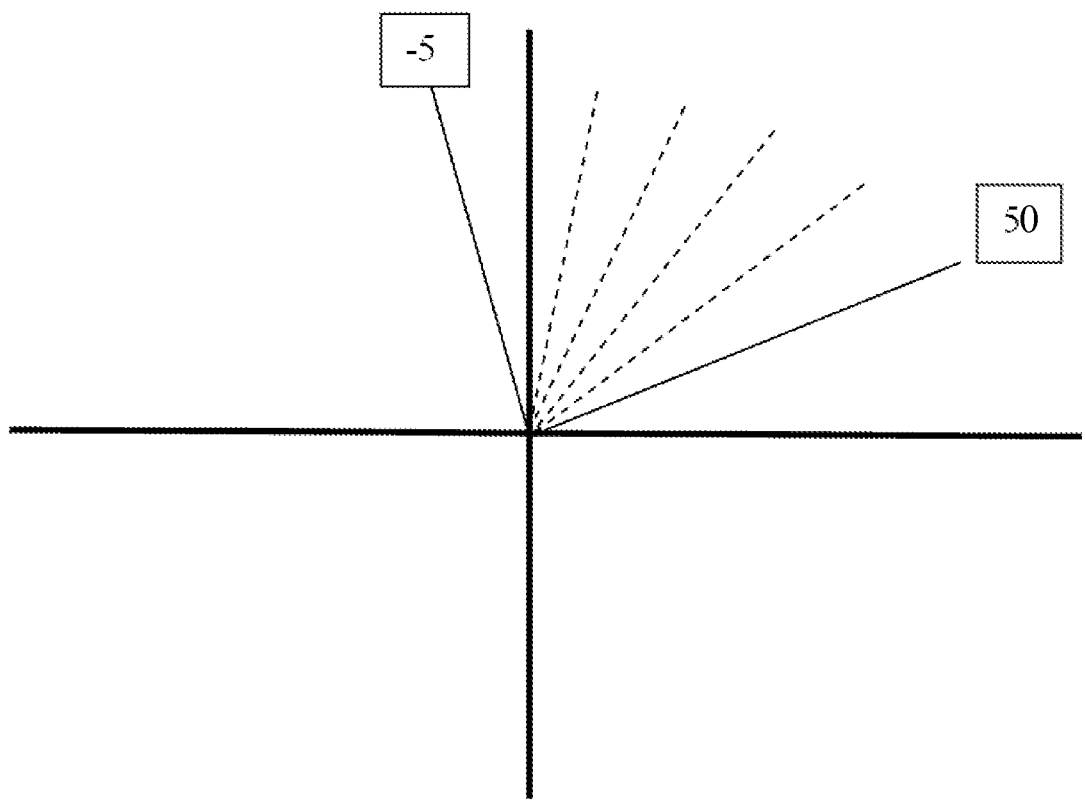
FIG. 3 is a graph of bins for building perpendicularity testing in accordance with an example of the present technology.

The building can be evaluated as follows. A first step can be to consider how close the building orientation is to the North/South line 215. Reference will now be made to FIG. 3. Any line (i.e., building wall) can be rotated to fall within an angle window. For example, an angle window of −5 degrees to +50 degrees may be used. This angle window is merely an example. Other angle ranges of greater or lesser amounts may also be used. In this example, all angles are measured from North (i.e., the top of FIG. 2). The area between the −5 degree and 50 degree marks can be divided into N different bins. Equal division of the bins can make understanding subsequent methods easier to understand. The range of angles within the angle window can be divided into any desired number of bins in any desired size increment. In one example, N=11 so the span of 55 degrees is split into 5 degree increments. If a line or wall orientation falls outside of the range, the line can be rotated by adding 90 degrees to the angle of orientation until the angle is within the −5 to 50 degree range. The angle can be wrapped back around when the angle exceeds 360 degrees.

Next, the average orientation of the building can be calculated. The total average angle can be calculated using the following formula:

$$\theta_T = \frac{\sum \theta_i L_i}{L_t}$$

Where $\theta_i$ is the angle of wall segment i, $L_i$ is the length of wall segment i, $L_t$ is the sum of the length of all wall segments ($L_t = \Sigma L_i$), and $\theta_T$ is the total average angle. When $\theta_T$ is determined, $\theta_T$ can be used to correct all navigation in the building.

The perpendicularity of the building can be tested. As with the method described above, each wall can be rotated by 90 degree increments to fit within the range of angles. The total length of each wall segment can be placed in the appropriate bin. Thus, the length of all walls falling within a same 5 degree range in this example can be added together.

Buildings with only right angles are highly perpendicular and will have the total length fall within a single bin. Buildings with lesser perpendicularity will have the length divided among multiple bins. If most of the length is in a single bin (or two adjacent bins) the building can be considered substantially perpendicular. As a result, the angle $\theta_T$ can be used to correct building skew and tracking within the building can accurately be confined to the walls of the building model. If there are several bins that contain significant wall lengths, and/or if the length is disparately divided among various bins, the building may be considered not perpendicular and the correction may not be used to avoid faulty tracking.

Using the building of FIG. 2 as an example, walls A, D, F, and H are parallel to one another and would fall into a same bin of FIG. 3. Walls B, E, G, and I are parallel to one another and perpendicular to walls A, D, F, and H. Walls B, E, G, and I do not fit into a bin of FIG. 3 without rotation. After rotation by 90 degrees or 270 degrees (depending on the direction of rotation), however, walls B, E, G, and I fall into a same bin as walls A, D, F and H. Wall C would fall into a separate bin. The cumulative lengths of walls, A, B, D, E, F, G, H, and I in one bin are much greater than the length of wall C in another bin. Thus, the building of FIG. 2 may be considered substantially perpendicular and the correction may be applied with an expectation of substantial accuracy.

The methods for skew correction and perpendicularity testing can be used together or separately.

Also, though the above methods are described in application to perpendicular buildings, the same principles can be applied to test geometrical conformity of non-perpendicular buildings or to determine desired correction angles for buildings such as the Pentagon, for example.

In one example, the corrections can be applied to the received tracking data when a person is inside a building and the corrections can be stopped (i.e. not applied) when the person is located outside of the building. In one example, a bounding box (FIG. 2, dashed lines 215, 220) can be used to determine whether to apply the corrections. Other bounding boxes can include boxes that are aligned with the building and boxes that are limited by boxes from other buildings.

Figure 4:
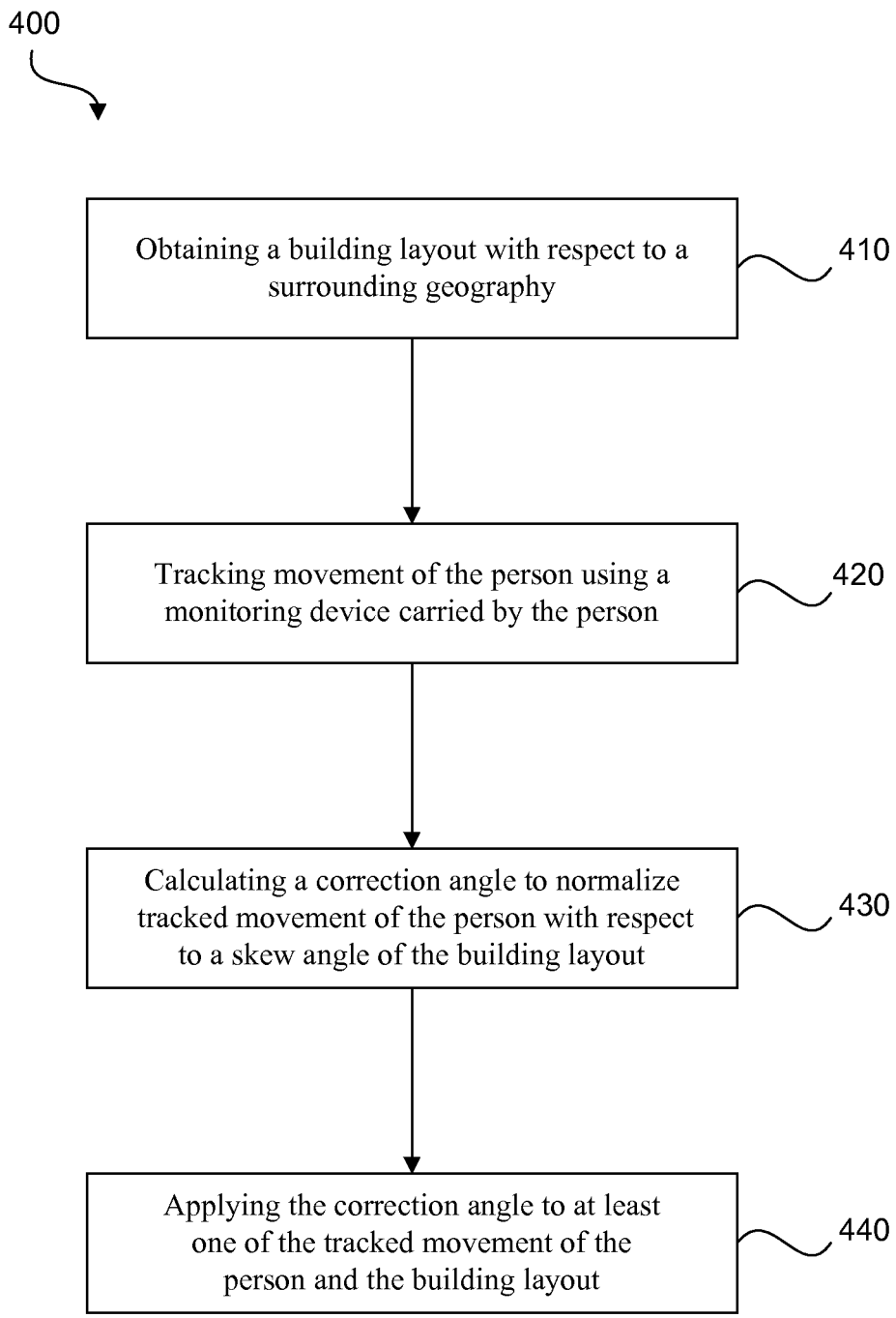
FIG. 4 is a flow diagram of a method for tracking a person in accordance with an example of the present technology.

Referring to FIG. 4, a flow diagram of a method 400 for tracking a person in a building is shown in accordance with an example of the present technology. The method includes obtaining 410 a building layout with respect to a surrounding geography. Obtaining a building layout is further described in related application Ser. No. 12/709,003, previously incorporated herein by reference. As a brief example of obtaining a building layout, a satellite image can be obtained and an outline of the building can be traced. A number of building floors can be input, and a position or orientation of halls and other building features can be estimated or approximated based on the satellite image and/or building outline.

The method 400 can further include tracking 420 movement of the person using a monitoring device carried by the person, as has been described above. A correction angle can be calculated 430 to normalize tracked movement of the person with respect to a skew angle of the building layout. The correction angle can be applied 440 to at least one of the tracked movement of the person and the building layout.

The method 400 can further include calculating a perpendicularity of the building. As has been described, calculating the perpendicularity can include operations such as determining an orientation of the building relative to a known direction; calculating an average orientation of walls of the building; and testing whether a majority of the walls fit within a predetermined number of angular intervals by rotating a wall orientation in 90 degree increments until the wall orientation fits within at least one predetermined angular interval or bin. The method steps of calculating 430 the correction angle and applying 440 the correction angle can include calculating the correction angle and applying the correction angle only when the majority of the walls fit within the predetermined number of angular intervals.

Figure 5A:
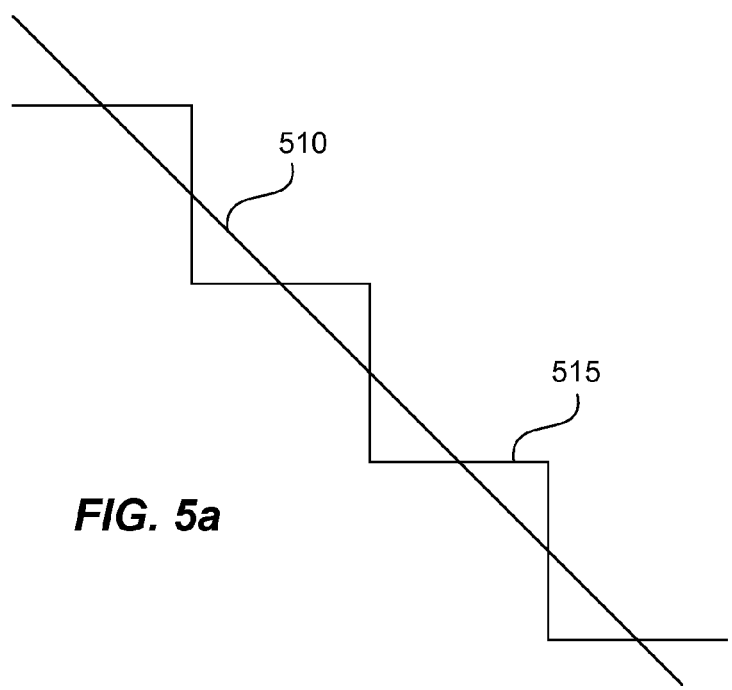
FIGS. 5a-5b include line drawings of tracked steps correlated with a fixed angle in accordance with an example of the present technology.
Figure 5B:
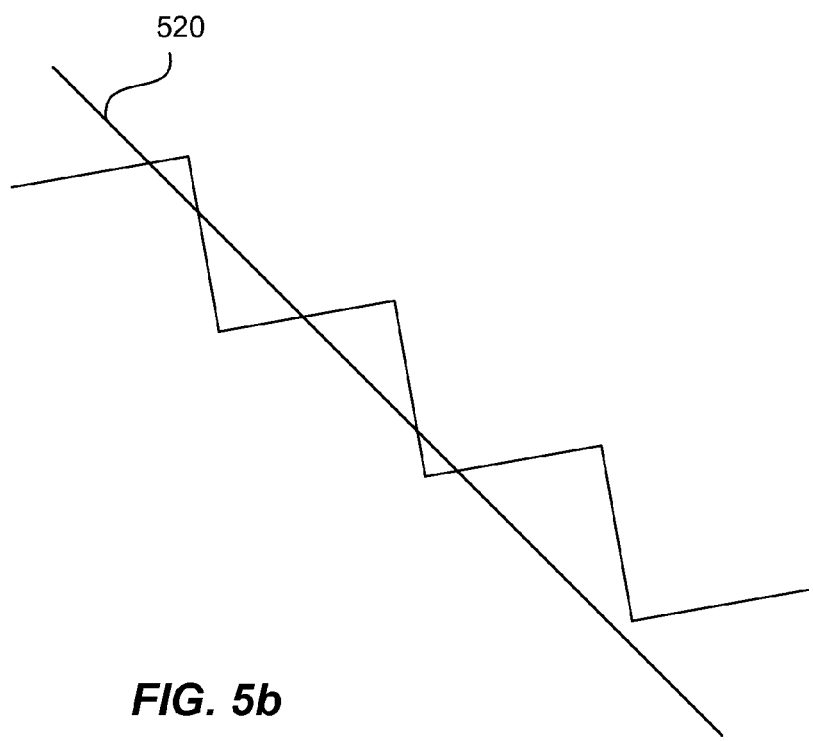

Reference will now be made to FIGS. 5a-5b, in which line drawings of tracked steps correlated with a fixed angle are illustrated in accordance with examples of the present technology. As described above, one example method of calculating and applying a correction angle includes calculating the correction angle and applying the correction angle only when the majority of the walls fit within the predetermined number of angular intervals. Using this method, the correction angle can be applied when there is substantial building perpendicularity and application of the correction angle is likely to result in more accurate tracking. However, if the building is substantially non-perpendicular, application of the correction angle is likely to result in less accurate tracking. In some cases, however, a building may have substantial perpendicularity, but the asset being tracked in the building may actually be travelling at an angle with respect to a wall or other building feature, which if corrected, could result in less accurate tracking.

FIG. 5a illustrates a line 510 parallel with a building wall. As a person walks, stepping from left foot to right foot to left foot and so forth, an actual walking pattern 515 appears non-linear. As shown, the tracked data showing the walking pattern may approximate a zigzag pattern. While the tracking module described above may be configured to track and display this zigzag pattern on a display, display of a straight line, as line 510, may be more desirable in some applications to cause less confusion to a monitoring attendant viewing the display. Particularly, display of the straight line may more accurately depict how a walking pattern or direction is visually perceived as opposed to an accurate depiction of how a monitoring device may detect the movement.

Whether the movement of the person is depicted as a straight line or not, a determination can be made as to whether the movement pattern ought to be normalized to a line parallel with the building wall. Therefore, in accordance with examples, applying the correction angle may include applying the correction angle when the tracked movement of the person with respect to the skew angle of the building layout is less than a predetermined angle. In other words, if the tracked movement relative to the skew angle of the building is within, for example, 5° or 10°, then the tracked movement may be normalized with respect to the building. In this example, normalization of the tracked movement relative to the wall can be a further refinement of normalization of the overall tracked movement relative to the building orientation. Thus, the building layout or tracked movement can be initially rotated relative to one another, and then the normalization of the person relative to the wall can be performed when desired to accurately depict whether the person is travelling parallel to the wall within the rotated orientation.

In another more specific example, tracking the movement of the person can include tracking individual steps of the person. Each step is represented in FIGS. 5a, 5b as the corners in the zigzag pattern. As in the example above, in this example normalization of the tracked movement relative to the wall can be a further and subsequent refinement of normalization of the overall tracked movement relative to the building orientation. The correction angle in the subsequent normalization step may be applied when two consecutive steps of the person with respect to the skew angle of the building layout are less than a predetermined angle. This is shown in FIG. 5a, where the left and right steps are at angles approximately 45° with respect to the line 510. In practice, the predetermined angle may typically be a smaller angle than 45°. Thus, where the left and right steps are less than a predetermined angle, such as 50° with respect to the line for example, the walking pattern can be normalized to be parallel with the wall.

However, correction angle in the subsequent normalization step may be not applied when zero or one steps of the person with respect to the skew angle of the building layout are greater than the predetermined angle. This is illustrated in FIG. 5b where the steps to the right are at an angle of approximately 30° with respect to the line 520 and the steps to the left are approximately 60° with respect to the line. If the predetermined angle is set at 50°, for example, then one of the steps is less than the angle but the other is not. This difference may typically indicate that the person is either walking at an angle or is walking with an assymetrical step. An assymetrical step is typically not expected, so a determination or assumption may be made that the person is walking at an angle and the normalization to the wall is not applied. In most instances if a right or left step is corrected or not corrected to conform to a building layout, the other of the right or left step may also desirably be similarly corrected or not corrected to maintain symmetry. This can help maintain accuracy in tracking and the symmetry can also assist in correcting for drift in gyroscopes or other instruments.

In the examples of FIGS. 5a-5b, the lines 510, 520 are illustrated for example purposes. However, in practice, the angle of the steps can be compared directly to the wall or other building feature in the building model without necessarily projecting a line along a tracked movement of the person.

Figure 6:
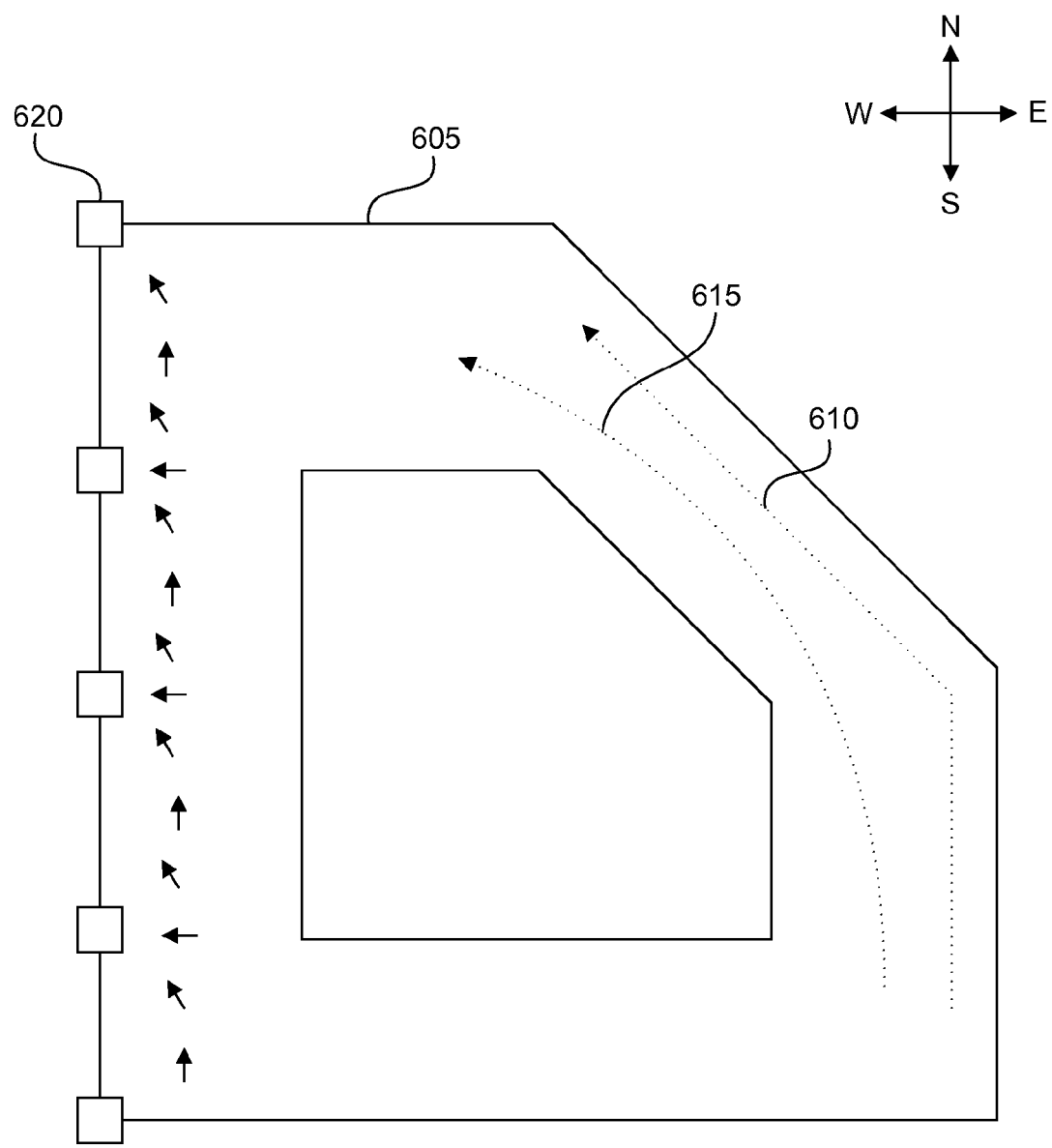
FIG. 6 is a top schematic view of a building layout in accordance with an example of the present technology.

Referring now to FIG. 6, a top schematic view of a building layout is illustrated in accordance with an example of the present technology. The result of wall normalization described above with regards to FIGS. 5a-5b can be seen at the right side of FIG. 6. In one example illustrated by line 610, the person has walked in fairly strict conformance with the building outline 605, which is reflected by the tracked movement illustrated as a straight line. In another example illustrated by line 615, the person has walked in a somewhat circular direction through the angled portion of the building, which is reflected by the tracked movement illustrated as a non-linear line.

FIG. 6 also illustrates a plurality of steel beams 620, which are commonly found in many buildings. If a magnetometer is used as a compass to, at least in part, detect movement and/or direction of the person within the building, the steel beams can lead to incorrect magnetometer output. For example, at the left side of the building, adjacent the wall with the steel beams, is a series of arrows, proceeding from the bottom of the figure to the top. The series of arrows represents a magnetic reading or output as a person walks from the portion of the building at the bottom of the figure to the portion at the top of the figure. When the person is sufficiently distanced from the steel beams, the magnetic compass output correctly identifies North. However, the output becomes skewed as the person approaches the steel beams. The monitoring device can include a magnetic compass or magnetometer and a gyroscope. To compensate for the incorrect output of the magnetic compass the received tracking data associated with the movement of the person can be adjusted based on the reading of the gyroscope. In other words, the stability of the gyroscope with respect to the magnetic attraction of the steel beams can be used to correct the magnetic drift and provide more accurate tracking capabilities.

In other examples, magnetic drift can be compensated for without the use of a gyroscope or other movement detection device. For example, where movement is tracked using a magnetic compass near a wall having steel beams or any other structure which may cause magnetic drift, an average output of the compass can be used to determine an approximately correct magnetic output of the received tracking data. Also, compass output can be ignored when the person is not moving. Alternatively, the output of the compass can be determined to be steady using the data received from the gyroscope when the person is not moving.

As has been mentioned briefly above, gyroscopes may drift over time and correction for the drift may be desirable. Because the magnetometer may also have drift within a building due to steel beams and the like, the magnetometer may not be a desirable source of stabilization or correction for gyroscopic drift. Therefore, the output of the gyroscope can be stabilized using the building layout. In other words, a direction of a wall, for example, can be used as an absolute against which the gyroscope output can be compared to determine whether drift is occurring and whether to correct for the drift.

In some instances, the gyroscope may drift in a situation where the walls do not provide a desired basis for stabilization and the drift can be to such an extent that stabilization of the gyroscope with the compass is desirable. For example, in circular or otherwise winding stairways, a gyroscope may typically exhibit an error of approximately 1% or more over a 360° rotation. Thus, for every 360° rotation, the gyroscope may have an output approximately 3.6° off from a correct output. If a person ascends or descends 8 flights of winding stairs, the gyroscope may give an output approximately 25° off from the correct output. Thus, in this example, the compass can be used to stabilize an output from the gyroscope at least two times faster when a detected movement of the person is on a circularly winding stairway comprising at least 1.5 full rotations as compared with when the movement of the person is not on a circularly winding stairway comprising at least 1.5 full rotations.

Figure 7:
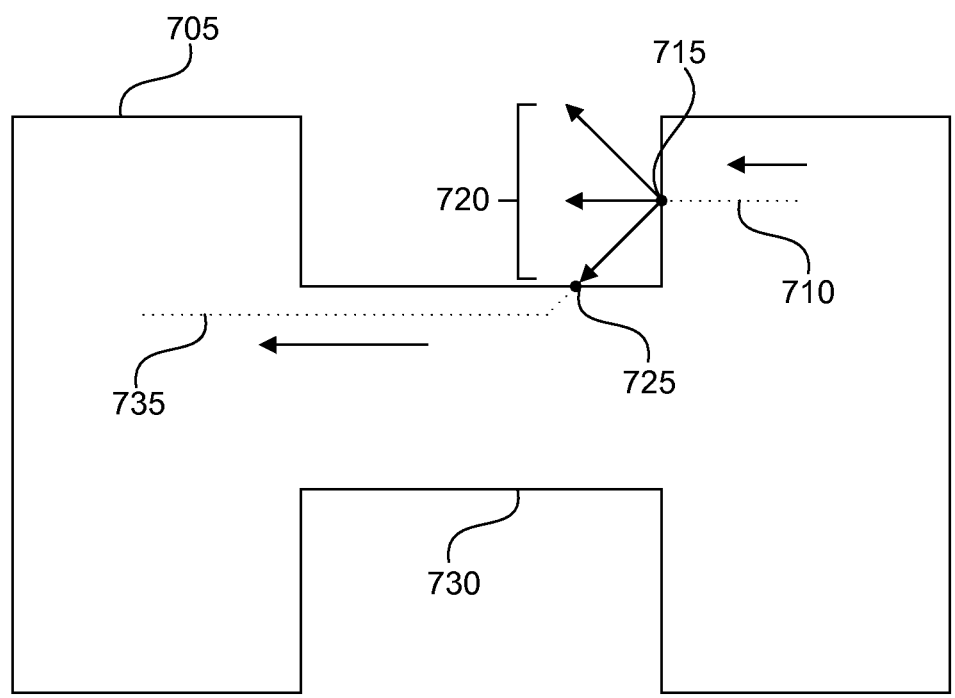
FIG. 7 is a top schematic view of a building layout illustrating forward look-ahead path correction in accordance with an example of the present technology.

Referring now to FIG. 7, a top schematic view of a building model 705 is shown illustrating forward look-ahead path correction in accordance with an example of the present technology. In some cases, tracking a person within a building will result in a tracked movement being offset in placement relative to a building model as compared with the actual movement of a person in the physical building. For tracking purposes, where tracking is constrained by the walls of the building, this can lead to inaccuracies in movement representation. FIG. 7 shows an example where a movement path 710 of the received tracking data runs directly into a wall of a building model 705. The monitoring station may continue to receive data indicating steps forward or to the side of the wall, but these may not be displayed if the movement is constrained by the walls of the building. While the constraints may be removed in some examples, movement through the walls in other examples may lead to even more inaccuracies in tracking and confusion at the monitoring station. Without some correction within the constraints, the monitoring station may continue to display continued footsteps at a same point 715. Therefore, to correct a movement offset of the person when a path of the movement of the person is blocked by a boundary, such as a wall of the building model and steps of the person are continued to be detected beyond the boundary, multiple paths 720 can be projected from the blocked point 715. For instance, a path may be projected straight ahead, a path may be projected angled at 45° to the left of the point, and a path may be projected angled at 45° to the right of the point. The straight path and angled paths on opposite sides of the straight path can be path continuity candidates. A determination can be made as to whether a path continuity candidate exists for the straight path or at least one of the two angled paths. For example, at point 725, one of the angled paths intersects a hallway 730. The other paths in this example do not provide viable continuity of movement within the building model 705. A position of the person can be projected onto an existing path continuity candidate according to a number of the detected steps of the person. Further detected movements can be tracked along the new path 735. If multiple paths provide an option for continuity, a best fit path may be selected. The best fit may be determined, for example, according to the building layout, by the number of detected steps, or any other suitable data, and may be situation dependent.

In some examples, movement of the person is not constrained by walls of the building, such as at ground level. In these examples, a determination can be made as to whether the tracked movement of the person is within the building or without the building according to a number of walls of the building a path of the tracked movement crosses. In one aspect, the inside/outside determination can be made using a mathematical test ray extending across the number of walls the tracked movement passes. If tracked movement or the test ray begins outside of the building and the person crosses one wall, the person can be assumed to be within the building. If the person crosses two walls, the person can be assumed to be without the building. Similarly, if tracked movement begins inside of the building and the person crosses one wall, the person can be assumed to be outside the building, and if the person crosses two walls, the person can be assumed to be inside the building. For odd-numbered wall crossings, the position of inside or outside the building is assumed to be the opposite of the starting position, and for even-numbered wall crossings, the position of inside or outside the building is assumed to be the same as the starting position.

Gyroscopes have a 'zero point', which is an angular rate sensed when the gyroscope is not moving. Over a number of days this zero point can drift enough to effect path accuracy. Automatic gyroscope zero point determination can be used to reduce the long term drift of gyroscopes on a day-by-day time period. The automatic gyroscope zero point determination can be performed by taking the average difference between the what the gyroscopes indicates is north and what the compass indicates is north, and over a very long period (such as several hours, for example) adjusting the gyroscope zero drift calibration.

The systems and methods described herein can be used to more accurately track a person within and around a building by correcting for skew. Also, tracking accuracy can increase by confining tracking to hallways and other building features derived from perpendicularity of the building.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. A computer-implemented method for tracking a person in a building, comprising:
   under control of one or more computer systems configured with executable instructions and having a processor and memory for executing the executable instructions,
      obtaining a building layout of a building with respect to a surrounding geography;
      tracking movement of the person with respect to the building using the processor and based on data from a monitoring device carried by the person;
      calculating a correction angle using the processor to normalize tracked movement of the person with respect to a skew angle of the building layout;
      applying the correction angle to at least one of the tracked movement of the person and the building layout using the processor; and
      correcting a tracked movement offset of the person when a path of the tracked movement of the person is blocked by a wall of the building layout and steps of the person are continued to be detected by:
         identifying a straight path and two angled paths on opposite sides of the straight path for path continuity candidates;
         determining whether a path continuity candidate exists for the straight path or at least one of the two angled paths, wherein the path continuity candidate intersects a wall of the building layout; and
         projecting a position of the person onto an existing path continuity candidate to place the projected position within the building layout, wherein the projected position along the path continuity is determined according to a number of the detected steps of the person.

2. The method of claim 1, further comprising calculating a perpendicularity of the building.

3. The method of claim 2, wherein calculating the perpendicularity further comprises:
   determining an orientation of the building relative to a known direction;
   calculating an average orientation of walls of the building; and
   testing whether a majority of the walls fit within a predetermined number of angular intervals by rotating a wall orientation in 90 degree increments until the wall orientation fits within at least one predetermined angular interval.

4. The method of claim 3, wherein calculating the correction angle and applying the correction angle further comprises calculating the correction angle and applying the correction angle only when the majority of the walls fit within the predetermined number of angular intervals.

5. The method of claim 1, wherein the monitoring device comprises at least one of an accelerometer, a barometer, a compass, and a gyroscope.

6. The method of claim 1, wherein the monitoring device comprises a compass and a gyroscope and wherein tracking the movement of the person comprises stabilizing an output from the compass using the gyroscope.

7. The method of claim 6, further comprising stabilizing an output of the gyroscope using the building layout.

8. The method of claim 1, wherein applying the correction angle further comprises applying the correction angle when the tracked movement of the person with respect to the skew angle of the building layout is less than a predetermined angle.

9. The method of claim 1, wherein tracking comprises receiving tracking data associated with individual steps of the person, and wherein applying the correction angle further comprises applying the correction angle to the received tracking data when two consecutive steps of the person with respect to the skew angle of the building layout are less than a predetermined angle and not applying the correction angle to the received tracking data when zero or one steps of the person with respect to the skew angle of the building layout are greater than the predetermined angle.

10. The method of claim 1, wherein the monitoring device comprises a magnetic compass and a gyroscope, wherein tracking the movement of the person comprises using the magnetic compass to stabilize an output from the gyroscope at least two times faster when a detected movement of the person is on a circularly winding stairway comprising at least 1.5 full rotations as compared with when the movement of the person is not on a circularly winding stairway comprising at least 1.5 full rotations.

11. The method of claim 1, wherein the monitoring device comprises a magnetic compass, and wherein tracking the movement of the person comprises ignoring an output of the magnetic compass when the person is not moving.

12. The method of claim 1, further comprising determining whether the tracked movement of the person is within the building layout or without the building layout according to a number of walls of the building layout a path of the tracked movement crosses.

13. The method of claim 1, wherein the monitoring device comprises a gyroscope, the method further comprising correcting gyroscope drift to realign the gyroscope with the building.

14. The method of claim 1, wherein the monitoring device comprises a compass and tracking the movement further comprises using an average output of the compass.

15. The method of claim 14, wherein the monitoring device further comprises a gyroscope, the method further comprising holding an output of the compass steady using an output of the gyroscope when the person is not moving.

16. A non-transitory computer-readable medium comprising computer-executable instructions which, when executed by a processor, implement a method for tracking a person in a building, comprising:
    receiving, at a monitoring station, data signals associated with a tracked movement of the person in the building as detected by a monitoring device carried by the person;
    calculating, using a correction module, a correction angle to normalize the tracked movement of the person with respect to a skew angle of a layout of the building;
    applying, using the processor, the correction angle to at least one of the tracked movement of the person and the building layout and to track the movement of the person by estimating a location of the person from the data signals; and
    correcting, using the processor, a movement offset of the a tracked movement of the person when the tracked path of the movement of the person is blocked by a wall of the building layout and steps of the person are continued to be detected, correcting the movement offset comprising:
        identifying a straight path and two angled paths on opposite sides of the straight path for path continuity candidates;
        determining whether a path continuity candidate exists for the straight path or at least one of the two angled paths, wherein the path continuity candidate intersects a wall of the building layout; and
        projecting a position of the person onto an existing path continuity candidate to place the projected position within the building layout, wherein the projected position along the path continuity is determined according to a number of the detected steps of the person.

17. The method implemented by the non-transitory computer-readable medium of claim 16, further comprising:
    determining an orientation of the building relative to a known direction;
    calculating an average orientation of walls of the building; and
    testing whether a majority of the walls fit within a predetermined number of angular intervals by rotating a wall orientation in 90 degree increments until the wall orientation fits within at least one predetermined angular interval.

18. The method implemented by the non-transitory computer-readable medium of claim 16, further comprising applying the correction angle when the movement of the person with respect to the skew angle of the building layout is less than a predetermined angle.

19. The method implemented by the non-transitory computer-readable medium of claim 16, further comprising tracking individual steps of the person and to apply the correction angle when consecutive steps of the person with respect to the skew angle of the building layout are less than a predetermined angle and not applying the correction angle when zero or one steps of the person with respect to the skew angle of the building layout are greater than the predetermined angle.

20. The method implemented by the non-transitory computer-readable medium of claim 16, wherein the monitoring device comprises a gyroscope and a magnetometer.

21. The method implemented by the non-transitory computer-readable medium of claim 16, wherein the monitoring device comprises a magnetic compass and a gyroscope, the gyroscope being configured to stabilize a readout from the compass.

22. The method implemented by the non-transitory computer-readable medium of claim 18, further comprising stabilizing an output of the gyroscope using the building layout.

23. The method implemented by the non-transitory computer-readable medium claim 16, wherein the monitoring device comprises a gyroscope and a magnetometer, the method further comprising stabilizing a readout from the gyroscope using the magnetometer at least two times faster when the movement of the person is on a circularly winding stairway comprising at least 1.5 full rotations as compared with when the movement of the person is not on a circularly winding stairway comprising at least 1.5 full rotations.

24. The method implemented by the non-transitory computer-readable medium of claim 16, wherein the monitoring device comprises a magnetic compass, the method further comprising ignoring an output of the magnetic compass when the person is not moving.

25. The method implemented by the non-transitory computer-readable medium of claim 16, further comprising determining whether the movement of the person is within the building or without the building according to a number of walls of the building a path of the movement crosses.

26. The method implemented by the non-transitory computer-readable medium of claim 16, wherein the monitoring device comprises a magnetometer, the method further comprising using an average output of the magnetometer.

27. A system for tracking a person in a building, comprising:
    a monitoring station operable to receive data signals comprising a positional information associated with a movement of the person in the building as detected by a monitoring device carried by the person;
    a processor comprising a tracking module configured to track the movement of the person with respect to a building layout of the building by estimating a location of the person from the data signals; and
    the processor comprising a forward look-ahead path correction module for correcting a movement offset of the person when a path of the movement of the person is blocked by a wall of the building and steps of the person are continued to be detected, the forward look-ahead path correction module configured to:
        identify a straight path and two angled paths on opposite sides of the straight path for path continuity candidates;
        determine whether a path continuity candidate exists for the straight path or at least one of the two angled paths, wherein the path continuity candidate intersects a wall of the building layout; and
        project a position of the person onto an existing path continuity candidate to place the projected position within the building layout, wherein the projected position along the path continuity is determined according to a number of the detected steps of the person.

* * * * *